US006459766B1

(12) United States Patent
Srinivasan-Rao

(10) Patent No.: US 6,459,766 B1
(45) Date of Patent: Oct. 1, 2002

(54) PHOTON GENERATOR

(75) Inventor: Triveni Srinivasan-Rao, Shoreham, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 0 days.

(21) Appl. No.: 09/551,236

(22) Filed: Apr. 17, 2000

(51) Int. Cl.[7] .............................. H01S 3/00; H01J 35/14

(52) U.S. Cl. ........................ 378/119; 378/138; 315/500; 315/507

(58) Field of Search ................................ 378/119, 138, 378/120, 121, 137; 372/2; 315/3.5, 5, 500, 503, 507

(56) References Cited

U.S. PATENT DOCUMENTS

| | | | | |
|---|---|---|---|---|
| 5,815,517 A | * | 9/1998 | Ikegami | 372/2 |
| 5,825,847 A | * | 10/1998 | Ruth et al. | 378/119 |
| 6,035,015 A | * | 3/2000 | Ruth et al. | 378/119 |

OTHER PUBLICATIONS

Esarey et al, "Nonlinear Thomson Scattering of Intense Laser Pulses from Beams and Plasmas," The American Physical Society, vol. 48, No. 4, 10/93 pp. 3003–3021.

Ride et al, "Thomson Scattering of Intense Lasers from Electron Beams at Abitrary Interactin Angles," The American Physical Society, vol. 52, No. 5, 10/93, pp. 5425–5441.

Pogorelsky, "Ultra–Bright X–Ray and Gamma Sources by Compton Backsattering of CO2 Laser Beams," Nuclear Instruments and Methods in Physics Research BNL–63985 Report, Jan. 1997, pp. 1–18.

Srinivasan–Rao, "Table Top, Pulsed, Relativistic Electron Gun With GV/m Gradient," AIP Conference Proceedings, Lake Tahoe, CA, 12–18 Oct. 1996 pp.: 1–6.

Batchelor et al, "A High Current, High Gradient, Laser Excited, Pulsed Electron Gun," E.P.A.C. 1998, pp.: 1–4.

Srinivasan–Rao et al, "Dark Current Measurements at Field Gradients above 1 GV/m," Pres., 8th Workshop on Advd. Acc. Concepts, Baltimore, MD BNL Report 65746, Jul. 1998, seven pages.

Srinivasan–Rao et al, "Optimization of Gun Parameters for a Pulsed Power Electron Gun," Pres., 8th Workshop on Advd. Acc. Concepts, Baltimore, MD BNL Report 65747, Jul. 1998, eleven pages.

Batchelor et al, "A Novel High Gradient Laser Modulated, Pusled Electron Gun," Pres., 17th Int'l Conf. on High Energy Accelerators, Dubna, Russia BNL Report 65895, Sep. 1998, four pages.

Srinivasan–Rao et al, "Simulation, Generation, and Characterization of High Brightness Electron Source at 1 GV/m Gradient," Pres., PAC 99 Conf. NY, NY, BNL Report 66464, 3/29–42/99, four pages.

* cited by examiner

*Primary Examiner*—Drew A Dunn
(74) *Attorney, Agent, or Firm*—Margaret C. Bogosian

(57) ABSTRACT

A photon generator includes an electron gun for emitting an electron beam, a laser for emitting a laser beam, and an interaction ring wherein the laser beam repetitively collides with the electron beam for emitting a high energy photon beam therefrom in the exemplary form of x-rays. The interaction ring is a closed loop, sized and configured for circulating the electron beam with a period substantially equal to the period of the laser beam pulses for effecting repetitive collisions.

17 Claims, 4 Drawing Sheets

PHOTON GENERATOR

This invention was made with Government support under contract number DE-AC02-98CH10886, awarded by the U.S. Department of Energy. The Government has certain rights in the invention.

BACKGROUND OF THE INVENTION

The present invention relates generally to x-ray generation, and, more specifically, to photon generator sources.

X-rays have many applications in medicine, industry, biological science, and materials science. However, a conventional synchrotron configured for generating xrays is quite large and expensive and is therefore not practical for widespread use.

A smaller type of x-ray source being developed is the Laser Synchrotron Source (LSS). In the LSS, a laser beam collides with an electron beam accelerated in an interaction cell to produce a high energy photon beam, such as x-rays, based on Compton or Thomson scattering.

Peak flux and brightness for the high energy photons produced in a LSS photon generator are limited by the specific configuration of the apparatus utilized.

Accordingly, it is desired to provide a compact photon generator for producing high energy photons with high brightness.

BRIEF SUMMARY OF THE INVENTION

A photon generator includes an electron gun for emitting an electron beam, and a laser for emitting a laser beam. The laser beam repetitively collides with the electron beam for emitting a high energy photon beam therefrom in the exemplary form of xrays.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
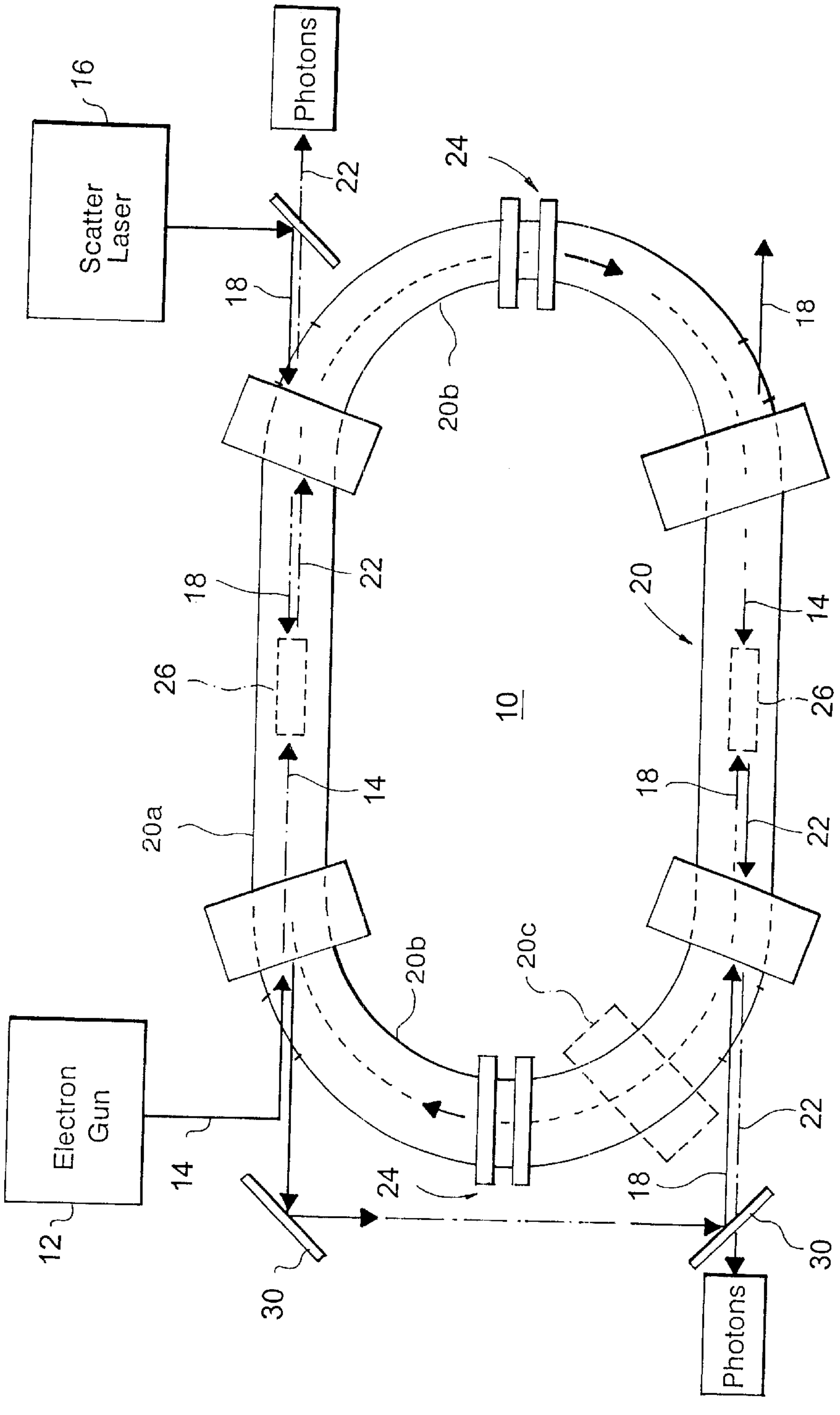
FIG. 1 is a schematic representation of a photon generator in accordance with an exemplary embodiment of the present invention.

Illustrated schematically in FIG. 1 is a photon generator or apparatus 10 in accordance with an exemplary embodiment of the present invention. The photon generator is an improvement over the LSS, and includes means in the form of a high energy electron gun 12 for emitting a relativistic electron beam 14.

Means in the form of a high energy laser 16 are provided for emitting a laser beam 18. An evacuated interaction track or ring 20 is operatively joined to the electron gun and the laser for circulating the electron beam 14 in a closed loop therethrough to repetitively collide with the laser beam 18 for in turn emitting a high energy photon beam 22 from collisions between the electron and laser beams. In this way, high energy photons are generated or produced by scattering laser light off relativistic electrons based on Thomson scattering or Compton scattering. The resulting photon beam 22 may be in the exemplary form of x-rays, gamma rays, visible light, ultraviolet light, or other narrow band electromagnetic radiation, and enjoys high brightness.

The electron gun 12 illustrated schematically in FIG. 1 may have various configurations for producing high energy electrons for scattering in the ring. Similarly, the scattering laser 16 may also have various configurations for producing a high energy laser beam for scattering by the electrons upon collision inside the interaction ring.

In a preferred embodiment, the scatter laser 16 is configured to emit the laser beam 18 in a train of pulses at a predetermined and preferably constant repetition rate. The electron gun 12 also is configured to emit the electron beam 14 in a train of electron pulses. Correspondingly, the interaction ring 20 is sized and configured for circulating an individual electron beam pulse with a predetermined period or periodicity which is substantially equal to the period corresponding to the repetition rate of the laser beam pulses for effecting repetitive collisions inside the ring. In each collision of the electron beam pulse with the train of laser beam pulses a corresponding number of photons are produced by Thomson scattering. The resulting photon beam 22 can therefore enjoy a substantially high average brightness.

The exemplary interaction ring 20 illustrated in FIG. 1 is preferably oval in shape with a pair of opposite straight sections or legs 20*a,* and a pair of opposite arcuate turns or bends 20*b* joined in turn to the two legs in a closed oval loop.

The electron gun 12 is disposed to emit the electron beam pulse 14 into the interaction ring 20 in a first rotary direction, which is clockwise in the FIG. 1 schematic. The scatter laser 16 is disposed using suitable folding mirrors as required to emit the laser beam pulses 18 into the interaction ring 20 in an opposite, second direction, which is counterclockwise in the upper leg shown in the FIG. 1 schematic, for colliding with the opposing electron beam pulse.

The interaction ring therefore permits the electron beam pulse to circulate in an oval closed loop in the first direction, with the laser beam pulses being directed oppositely thereto in the second direction for colliding head-on with the electron beam pulse for effecting Thomson scattering. In this way, the same electron pulse may be repetitively hit by laser pulses in turn in the train as the electron pulse circulates in the ring.

The basic interaction ring may be a modified form of a conventional electron beam storage ring in which electrons are circulated with minimal energy loss. The ring is evacuated to sufficiently high vacuum levels, and suitable windows are provided for receiving and dumping the electron and laser pulses in the modified ring.

In the exemplary embodiment illustrated in FIG. 1, the interaction ring includes a plurality of focusing elements or magnets 24 operatively joined to the ring, around the bends 20*b* for example, for focusing the electron beam 14 with a narrow waist at a collision zone 26 preferably in the middle of both straight legs 20*a.*

A plurality of bending elements or magnets 28 are operatively joined to the ring at the corresponding four corners or junctions of the legs and bends for bending or directing the electron beam to circulate inside the ring.

The bending magnets are powered to maintain the annular circulation trajectory of the electron beam inside the ring for a sufficient number of revolutions or cycles. An individual electron pulse may be introduced at any of the four corners of the ring by unpowering the corresponding bending magnet, and an individual electron pulse may be discharged from the ring at any of the four corners by also unpowering the bending magnet thereat.

As the electron pulse circulates inside the ring, it is focused by the magnets 24 at the two collision zones 26 in the straight legs. Correspondingly, the scatter laser 16 is configured using suitable optics or focusing lenses to focus the laser beam pulses at the waist of the electron beam pulse in at least one of the two legs at the corresponding collision zone 26.

In this way, the electron pulse 14 is focused with a narrow waist in the collision zone 26 inside the interaction ring, and the laser pulses 18 are focused at the electron beam waist inside the collision zone 26 for effecting collision thereat and Thomson scattering.

The laser beam illustrated in FIG. 1 may or may not circulate inside the interaction ring as desired. In the preferred embodiment illustrated, means in the form of a plurality of reflecting or circulating mirrors 30 are optically aligned with the interaction ring for circulating the laser pulses 18 in the loop for repetitively colliding with the electron beam pulse at respective ones of the two waists in the collision zones. In this way, the same electron beam pulse 14 may collide with laser beam pulses in turn in both legs 20*a* of the ring for correspondingly producing high energy photons. Since energy of the laser beam degrades due to multiple reflections from the mirrors, an optical amplifier (not shown) may be used in series therewith for compensating for the energy loss.

Furthermore, an optional booster 20*c* may be located in one of the two bends 20*b* to compensate for energy loss in the circulating electron pulse due to scattering. The two electron boosters 12*b* and 20*c* would be operatively joined to the synchronizer 48 shown in FIG. 3 for synchronized operation with the electron pulse being power boosted.

As indicated above, the electron gun 12 and scattering laser 16 may be configured for maximizing performance of the cooperating interaction ring in a relatively compact assembly. The electron gun 12 is preferably configured for emitting a relativistic electron beam 14 into the ring 20 with relativistic energies in the range of about 1–10 MeV to result in a high brightness electron beam.

Correspondingly, the laser 16 is preferably configured for emitting the laser beam 18 with an energy up to about 100 mJ at a wavelength of about 750 nm and with a pulse duration of about 3 ps. Such a high energy laser beam pulse colliding head-on with the electron beam having an exemplary 100 pC electron bunch in 100 fs duration with an energy of about 5 MeV can produce $10^6$ photons at a wavelength of about 1.6 nm, and about 800 eV per collision. The peak brightness of the resulting photon beam is about $10^{22}$ photons/(s0.1% BW area solid angle), which is comparable to that in a second generation synchrotron light source.

Figure 2:
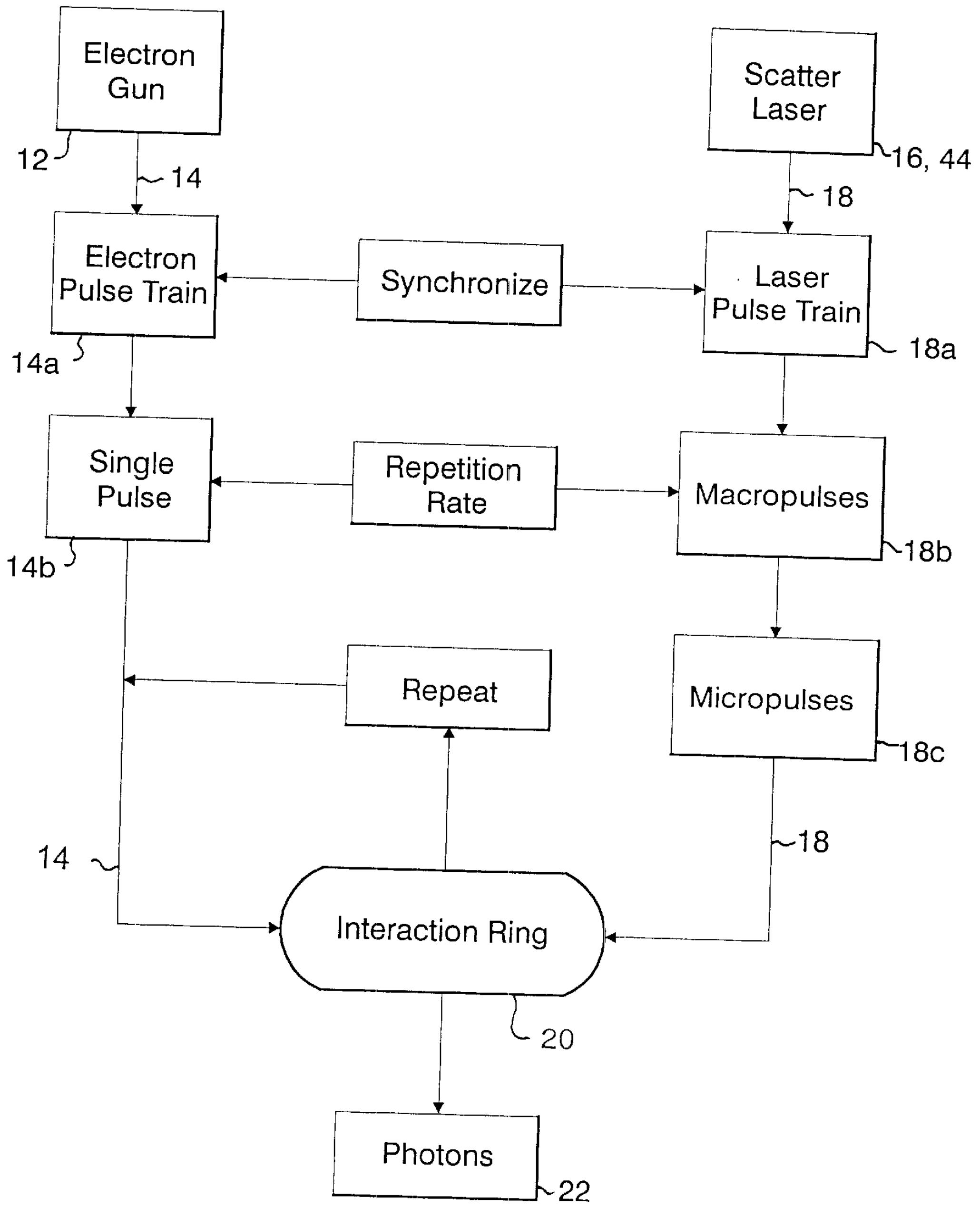
FIG. 2 is a flowchart of a preferred embodiment of operating the photon generator illustrated in FIG. 1.

As shown in the FIG. 2 flowchart, the scattering laser 16 is configured for emitting the laser beam 18 preferably in a train 18*a* including a plurality of macropulses 18*b* at a first repetition rate. Each macropulse includes a plurality of micropulses 18*c* at a different second repetition rate of about 80 MHz having a corresponding period of about 12 ns which is substantially equal to the circulation period or periodicity of the electron beam pulse circulating inside the interaction ring.

The electron gun 12 is correspondingly configured for producing an electron pulse train 14*a* of individual or single electron beam pulses 14*b*. The electron gun and scatter laser are suitably synchronized for coordinating production of the electron and laser pulse trains.

The resulting laser macropulses 18*b* preferably have a first repetition rate of about 100 Hz, with a duration of about 1 microsecond. Each macropulse 18*b* preferably has about 100 micropulses 18*c* of about 3 ps duration. Each of the micropulses collides with an electron beam pulse to produce the photon beam having about $10^6$ x-ray photons per collision with a duration of about 100 fs resulting in about $10^{10}$ photons per second.

The wavelength of the resulting photon beam 22 may be tuned in small steps by tuning the laser wavelength, and in larger steps by changing the energy of the electron beam. With a scatter laser 16 tunable in the range of about 750–850 nm, and the electron energy variable in the range of about 1–10 MeV, narrow bandwidth radiation for the resulting photon beam may be continuously tunable from about 53 nm to 0.4 nm.

A single electron beam pulse 14*b* is produced by the gun at the same repetition rate as the macropulses 18*b* produced by the laser. The electron beam pulse 14*b* is injected into the interaction ring 20 where it circulates therearound in repeating revolutions coordinated with the micropulses 18*c* of each macropulse.

As the single electron beam pulse circulates in the interaction ring, it collides with an individual micropulse 18*c* in turn for each revolution until the full complement of micropulses in each macropulse are utilized for effecting Thomson scattering with the same electron beam pulse.

In an exemplary embodiment, the repetition rate of the micropulses 18*c* corresponds with a period of about 12 ns, with the interaction ring 20 being configured for orbiting the electron beam pulse with a 12 ns period matching the micropulse period so that the electron pulse is synchronized to collide with a succeeding micropulse for each orbit or revolution of the electron pulse within the interaction ring. At the completion of all the micropulses in a single macropulse colliding with a common electron pulse, the spent electron pulse is discharged from the interaction ring, and the next electron pulse is injected therein for repeating again the collision cycle for the next macropulse.

Figure 3:
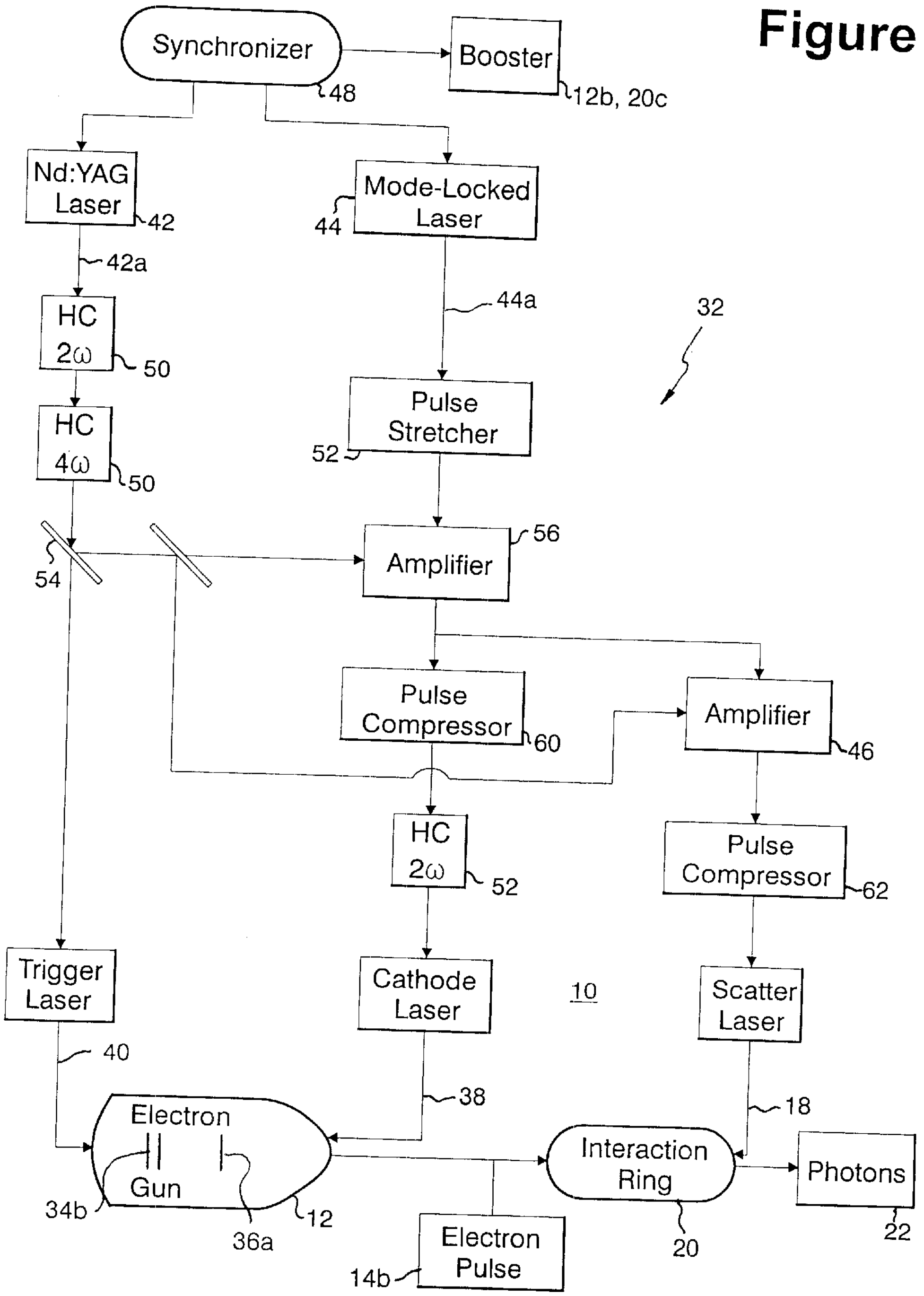
FIG. 3 is a flowchart representation of the photon generator illustrated in FIG. 1 in accordance with an exemplary embodiment.

As indicated above, the electron gun 12 may have various conventional configurations for cooperating with a correspondingly configured scattering laser 16. FIG. 3 illustrates an exemplary embodiment of a laser system 32 cooperating with the interaction ring 20 and the electron gun 12, which is illustrated in more detail in FIG. 4.

Figure 4:
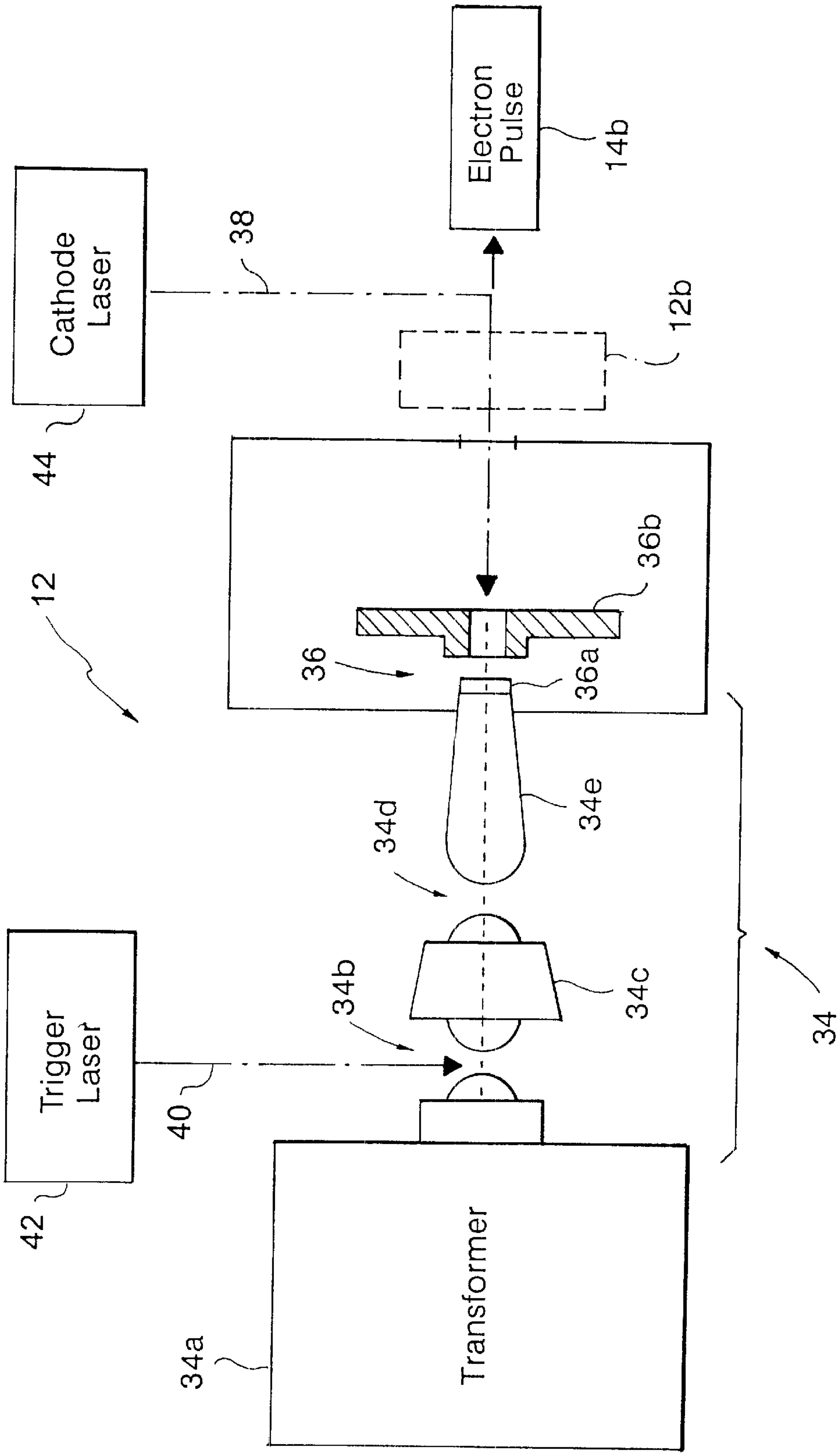
FIG. 4 is a schematic representation of the electron gun illustrated in FIG. 3 in accordance with an exemplary embodiment.

As shown in FIG. 4, the electron gun 12 is preferably in the form of a laser excited photocathode electron gun having a conventional configuration. Alternatively, the electron gun may be an RF gun, thermionic gun, or field emission gun, for example.

In the preferred embodiment, a high voltage pulse generator 34 includes a resonant transformer 34*a* cooperating with a SF6-gas filled, pressurized triggering spark gap 34*b*. The trigger gap 34*b* is defined between the transformer and a forming or conducting line 34*c*. The forming line 34*c* defines a pulse sharpening spark gap 34*d* with an impedance or load matching transformer 34*e*. A vacuum diode 36 includes a cathode 36*a* joined to the impedance transformer, and an anode 36*b* predeterminedly spaced therefrom.

The pulse generator 34 is configured for applying a pulsed high voltage in the range of about 0.5–1 MV between the electrodes of the vacuum diode 36 for establishing accelerating gradients of about 1 GV/m. By simultaneously irradiating the cathode 36*a* with a short laser pulse less than about 1 ps, the cathode emits photoelectrons whose characteristics are controlled by the laser beam. The high field accelerates the electrons to relativistic energies resulting in a high brightness electron beam pulse 14*b*. The energy of this electron beam may be increased, if required, to about 10 MeV by an optional booster cavity 12*b* having a conventional configuration cooperating with the diode.

Since the various components of the photon generator 10 illustrated in FIG. 3 are configured for emitting high energy pulses, synchronization of those pulses is required for maximizing performance. The laser system 32 is preferably configured to emit a cathode laser beam 38 for irradiating the cathode 36*a* in the electron gun for emitting electrons. The laser system is also configured to emit a trigger laser beam 40 to trigger the SF6-gas filled, pressurized spark gap 34*b* in synchronization with the cathode laser beam 38.

And, the laser system is additionally configured to emit the scatter laser beam 18 synchronized with the cathode laser beam for colliding with the electron beam pulse inside the interaction ring 20.

Accordingly, the laser system 32 illustrated in FIG. 3 is configured for delivering three different and distinct laser beams for synchronously operating the photon generator 10. The cathode laser beam 38 has relatively low energy of about 10–100 micro-Joules, with an ultrashort pulse duration less than about 1 ps, and with about 4–5 eV ultraviolet photon energy for irradiating the cathode 36*a* to emit electrons.

The trigger laser beam 40 has high energy greater than about 50 mJ with a relatively long pulse duration in the range of about 1–10 ns, of ultraviolet wavelength to trigger the spark gap 34*b* of the pulse generator to synchronize the high voltage pulse with the cathode laser beam 38.

The scattering laser beam 18 has relatively high energy in the range of about 10–100 mJ with a short pulse duration up to about 10 ps which is preferably tunable for Thomson scattering by the electron beam pulse inside the interaction ring 20.

The three different laser beams 18,38,40 of the laser system 32 illustrated in FIG. 3 may be synchronously formed using two differently configured lasers in a preferred embodiment.

For example, a first laser 42 is configured to emit the trigger laser beam 40. A second laser 44 is configured to emit the cathode laser beam 38. And, a power amplifier 46 is operatively joined to the second laser to emit the scatter laser beam 18 in synchronization therewith.

A suitable synchronizer 48 including a master clock is operatively joined to the two lasers 42,44 for coordinating operation thereof in a conventional manner.

In the preferred embodiment illustrated in FIG. 3, the first laser 42 is a Nd:YAG laser for emitting an ultraviolet laser beam pulse 42*a* which is twice frequency doubled in corresponding harmonic crystals (HC) 50 for forming the triggering laser beam 40 delivered to the electron gun.

The second laser 44 is preferably a mode locked laser configured for initially emitting an infrared laser beam 44*a* having a pulse duration of less than about 100 fs with a wavelength of about 800 nm, with a repetition rate of about 80 MHz which corresponds with a period of about 12 ns. The mode locked laser may be a titanium sapphire solid state laser, for example.

A pulse stretcher 52 is operatively joined to the second laser 44 for increasing the pulse duration to about 100 ps.

The first laser 42 is preferably operatively joined to the second laser 44 for amplifying the cathode laser beam 38, as well as pumping the power amplifier 46 to amplify the scatter laser beam 18.

This is accomplished by using a first splitting mirror 54 optically aligned with the second harmonic crystal 50 for splitting off a portion of the energy from the first laser beam 42*a* to pump or amplify the stretched second laser beam 44*a* in a preamplifier 56 optically aligned with the stretcher and splitting mirror 54.

A second splitting mirror 58 is optically aligned in turn with the first splitting mirror 54 for removing an additional part of the energy from the first laser beam 42*a* to pump the power amplifier 46 operatively joined thereto.

A first pulse compressor 60 is operatively joined to the pre-amplifier 56 for fully compressing the laser beam to the original pulse duration of about 100 fs which is then frequency doubled in another harmonic crystal 52 operatively joined thereto for producing the cathode laser beam 38.

A second pulse compressor 62 is operatively joined to the power amplifier 46 for partially compressing the amplified laser beam and tuning the scatter laser beam 18 with a pulse duration greater than about 100 fs, and preferably in the range of about 1–10 ps.

The photon generator described above in accordance with preferred embodiments is effective for producing an output photon beam having peak and average brightness comparable to that from a conventional non-photon generator. However, the photon generator is considerably smaller in size, e.g. less than about 200 sq. ft., than a conventional synchrotron, and with correspondingly reduced capital cost and operating cost. The photon energy may be continuously tunable from about 53 nm to about 0.4 nm for 1–10 MeV electron beam pulses. And, the pulse duration of the narrow bandwidth photon beam radiation may be variable from about 50 fs to about 3 ps.

The interaction ring provides a substantial improvement in repetitively colliding the high energy laser beam with the high energy electron beam for producing photon radiation from Thomson scattering. The photon radiation is monochromatic, and thusly eliminates the need for spectrometer, grating, and cooling elements, for example, which would otherwise be required in a typical synchrotron.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which I claim:

1. A photon generator comprising:

a laser for emitting a laser beam wherein said laser is configured to emit said laser beam in a train of pulses at a repetition rate;

an electron gun for emitting an electron beam wherein said electron gun is configured to emit said electron beam in an electron beam pulse; and an interaction ring operatively joined to said electron gun and laser for circulating said electron beam pulse in a closed loop therethrough to repetitively collide with said train of pulses for emitting a photon beam from collisions therebetween wherein said interaction ring is sized and configured for circulating said electron beam pulse with a period substantially equal to the period corresponding with said repetition rate for effecting said repetitive collisions.

2. A generator according to claim 1 wherein:

said interaction ring is oval with a pair of opposite straight legs and a pair of opposite bends;

said electron gun is disposed to emit said electron beam pulse into said interaction ring in a first direction; and said laser is disposed to emit said laser beam pulses into said interaction ring in an opposite, second direction for colliding with said electron beam pulse.

3. A generator according to claim 2 further comprising:

a plurality of focusing magnets operatively joined to said interaction ring for focusing said electron pulse with a narrow waist in said straight legs; and a plurality of bending magnets operatively joined to said interaction ring at junctions of said legs and bends for directing said electron pulse to circulate inside said ring; and wherein said laser is configured to focus said laser pulses at said electron pulse waist in one of said legs.

4. A generator according to claim 3 further comprising a plurality of circulating mirrors operatively joined to said interaction ring for circulating said laser pulses in said loop for repetitively colliding with said electron pulse at respective ones of said waists in said pair of legs.

5. A generator according to claim 1 wherein said electron gun comprises a laser excited photocathode electron gun including:

a high voltage pulse generator having a triggering spark gap; and a diode including a cathode for emitting electrons, and spaced from an anode.

6. A generator according to claim, 5 further comprising a laser system configured to emit:

a cathode laser beam for irradiating said cathode in said electron gun for emitting electrons;

a trigger laser beam for triggering said spark gap in synchronization with said cathode laser beam; and a scatter laser beam synchronized with said cathode laser beam for colliding with said electron beam pulse in said interaction ring.

7. A generator according to claim 6 wherein said laser system comprises:

a first laser configured to emit said trigger laser beam;

a second laser configured to emit said cathode laser beam; and an amplifier operatively joined to said second laser to emit said scatter laser beam.

8. A generator according to claim 7 wherein said first laser is operatively joined to said second laser for amplifying said cathode laser beam and pumping said amplifier to amplify said scatter laser beam.

9. A generator according to claim 8 wherein:

said first laser is a Nd:YAG laser; and said second laser is a mode locked laser.

10. A method of producing a photon beam comprising:

emitting a laser beam in a train of laser pulses at a repetition rate;

emitting an electron beam in an electron beam pulse; and circulating said electron beam pulse with a period substantially equal to the period corresponding to said laser repetition rate for repetitively colliding said electron beam pulse with said laser pulses for emitting a photon beam from said repetitive collisions therebetween.

11. A method according to claim 10 further comprising:

circulating said electron beam pulse in a closed loop in a first direction; and directing said laser pulses in said loop in an opposite second direction for colliding with said electron beam pulse.

12. A method according to claim 11 further comprising:

focusing said electron beam pulse with a narrow waist in said loop; and focusing said laser beam pulses at said electron beam pulse waist for collision thereat.

13. A method according to claim 12 further comprising:

focusing said electron beam pulse at a plurality of said waists in said loop; and circulating said laser beam pulses in said loop for repetitively colliding with said electron beam pulse at respective ones of said waists.

14. A method according to claim 11 further comprising:

emitting a relativistic electron beam in said loop with an energy in the range of about 1–10 MeV; and emitting said laser beam with an energy up to about 100 mJ at a wavelength of about 750 nm and with a pulse duration of about 3 ps.

15. A method according to claim 11 further comprising emitting said laser beam in said train 18*a* including a plurality of macropulses at a first repetition rate, with each macropulse having a plurality of micropulses at a different second repetition rate having a corresponding period substantially equal to said electron beam pulse circulation period.

16. A method according to claim 15 wherein:

said macropulses have a first repetition rate of about 100 Hz, with a duration of about 1 microsecond, and each macropulse includes about 100 micropulses; and each of said micropulses has a period of about 12 ns to produce said proton beam having about $10^6$ photons per collision, with a duration of about 100 fs.

17. A method according to claim 11 further comprising:

adjusting energy of said electron beam; and tuning wavelength of said laser beam for continuously tuning said photon beam with narrow bandwidth radiation from about 53 nm to about 0.4 nm.

* * * * *